United States Patent [19]
Horning et al.

[11] Patent Number: 6,097,891
[45] Date of Patent: Aug. 1, 2000

[54] ONE-TIME-USE CAMERA WITH VIEWFINDER INCAPACITATED WHEN REAR COVER PART REMOVED TO LOAD FRESH FILM IN CAMERA

[75] Inventors: Randy E. Horning, LeRoy; Mark A. Lamphron, Rochester; David Cipolla, Macedon, all of N.Y.

[73] Assignee: Eastman Kodak Company, Rochester, N.Y.

[21] Appl. No.: 09/251,970

[22] Filed: Feb. 17, 1999

[51] Int. Cl.$^7$ ..................................................... G03B 17/24
[52] U.S. Cl. ................................. 396/6; 396/382; 396/535
[58] Field of Search ................................ 396/6, 373, 382, 396/535

[56] References Cited

U.S. PATENT DOCUMENTS

| | | | |
|---|---|---|---|
| 4,882,600 | 11/1989 | Van de Moere | 396/6 |
| 5,349,410 | 9/1994 | Kamata . | |
| 5,761,542 | 6/1998 | Lamphron et al. . | |
| 5,784,652 | 7/1998 | Schroeder | 396/6 |
| 5,812,884 | 9/1998 | Sangregory . | |
| 5,815,740 | 9/1998 | Wagner . | |

Primary Examiner—David M. Gray
Attorney, Agent, or Firm—Roger A. Fields

[57] ABSTRACT

A one-time-use camera comprising a main body part, a cover part that can be separated at least partially from the main body part, and a viewfinder having a pair of front and rear viewing lenses optically aligned for viewing a subject to be photographed, is characterized in that the cover part is connected to one of the front and rear viewing lenses to move the one viewing lens out of optical alignment with the other viewing lens when the cover part is separated at least partially from the main body part, whereby the one viewing lens can be readily identified to prevent the viewfinder from being erroneously reused. Preferably, the one viewing lens is connected to the main body part in addition to being connected to the cover part in order to hold the cover part to the main body part. A fracture line of weakness exists between the one viewing lens and the main body part which is broken when the one viewing lens is moved out of optical alignment with the other viewing lens.

8 Claims, 3 Drawing Sheets

ONE-TIME-USE CAMERA WITH VIEWFINDER INCAPACITATED WHEN REAR COVER PART REMOVED TO LOAD FRESH FILM IN CAMERA

FIELD OF THE INVENTION

The invention relates generally to the field of photography, and in particular to one-time-use cameras. More specifically, the invention relates to a one-time-use camera with a viewfinder that is incapacitated to prevent it from being erroneously reused when a rear cover part is removed to load fresh (unexposed) film in the camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound from the film cartridge onto a film take-up spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

There is a problem in the recycling, i.e. reuse, of used camera parts, in that the reused parts may become worn or damaged and therefore should not be reused. Thus, it has been suggested that any worn or damaged parts be purposely fractured to render them visibly different during disassembly of the one-time-use camera to retrieve the exposed film. This allows the worn or damaged parts to be readily identified to be discarded, and prevents them from being erroneously reused.

One possible solution to the problem of erroneously reused parts is disclosed in prior art U.S. Pat. No. 5,349,410 issued Sep. 20, 1994. The patent suggests that an anti-backup pawl for the thumbwheel be broken when the rear cover part is separated from the main body part to remove the film cartridge from the cartridge receiving chamber. The rear cover part has a projecting hook that extends through a hole in the anti-backup pawl to engage the pawl. The anti-backup pawl is connected to the main body part at a weakened notch section. Thus, separating the rear cover part from the main body part breaks the anti-backup pawl away from the main body part at the weakened notch section. This allows the main body part to be readily identified to prevent it from being erroneously reused.

Another possible solution is disclosed in prior art U.S. Pat. No. 5,761,542 issued Jun. 2, 1998. In this instance, a fracture line of weakness or v-shaped groove divides a door cover portion of the rear cover part and a remaining cover portion of the rear cover part along a pivot axis of the door cover portion. The door cover portion is to be pivoted open relative to the remaining cover portion to remove the film cartridge from the cartridge receiving chamber. When the door cover portion is pivoted open relative to the remaining cover portion, a break or tear is created along the fracture line of weakness which permits the door cover portion to be separated from the remaining cover portion. Thus, the rear cover part can readily identified to prevent it from being erroneously reused.

A further solution is disclosed in prior art U.S. Pat. No. 5,815,740 issued Sep. 29, 1998. In this instance, the rear cover part and the main cover part are forcibly pulled apart from one another to cause a particular area of one of them to be broken away from the remainder of the part along a continuous line of weakness that circumscribes the area. This leaves a hole in place of the broken away area which can be readily identified to prevent the part from being erroneously reused.

SUMMARY OF THE INVENTION

According to one aspect of the invention, a one-time-use camera comprising a main body part, a cover part that can be separated at least partially from the main body part, and a viewfinder having a pair of front and rear viewing lenses optically aligned for viewing a subject to be photographed, is characterized in that:

the cover part is connected to one of the front and rear viewing lenses to move the one viewing lens out of optical alignment with the other viewing lens when the cover part is separated at least partially from the main body part, whereby the one viewing lens can be readily identified to prevent the viewfinder from being erroneously reused.

Preferably, the one viewing lens is connected to the main body part in addition to being connected to the cover part in order to hold the cover part to the main body part. A fracture line of weakness exists between the one viewing lens and the main body part which is broken when the one viewing lens is moved out of optical alignment with the other viewing lens.

According to another aspect of the invention, a method of incapacitating a viewfinder in a one-time-use camera to permit the viewfinder to be readily identified to be discarded rather than be erroneously reused comprises the steps of:

separating a cover part, which is connected to one of a pair of optically aligned front and rear viewing lenses of the viewfinder, at least partially from a main body part, and moving one of the front and rear viewing lenses out of optical alignment with the other viewing lens when the cover part is separated at least partially from the main body part, whereby the one viewing lens can readily be identified to prevent the viewfinder from being erroneously reused.

DETAILED DESCRIPTION OF THE INVENTION

Figure 1:
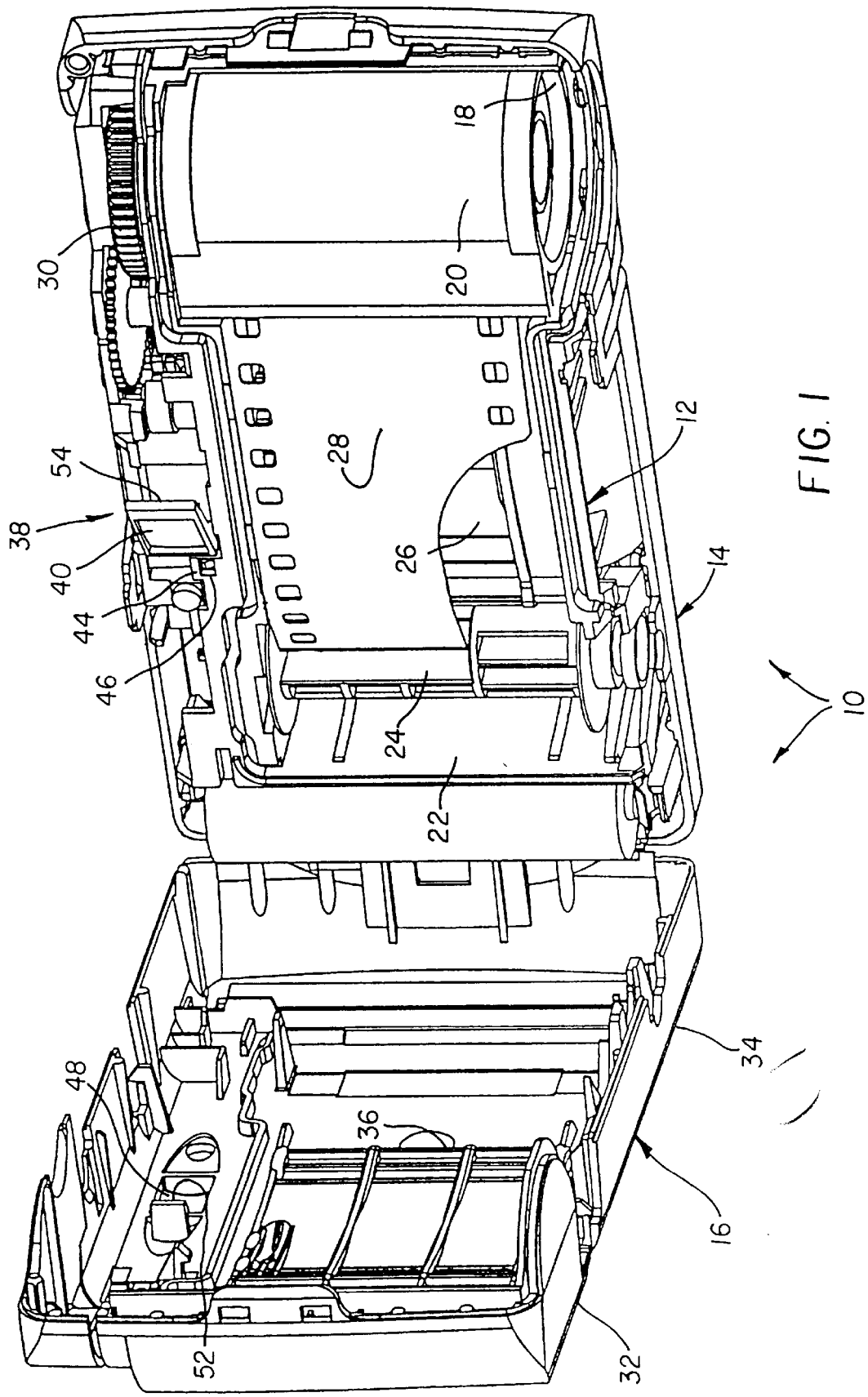
FIG. 1 is a rear perspective view of a one-time-use camera which is a preferred embodiment of the invention, showing a rear cover part separated from a main body part to move a rear viewing lens out of optical alignment with a front viewing lens of a viewfinder unit.
Figure 2:
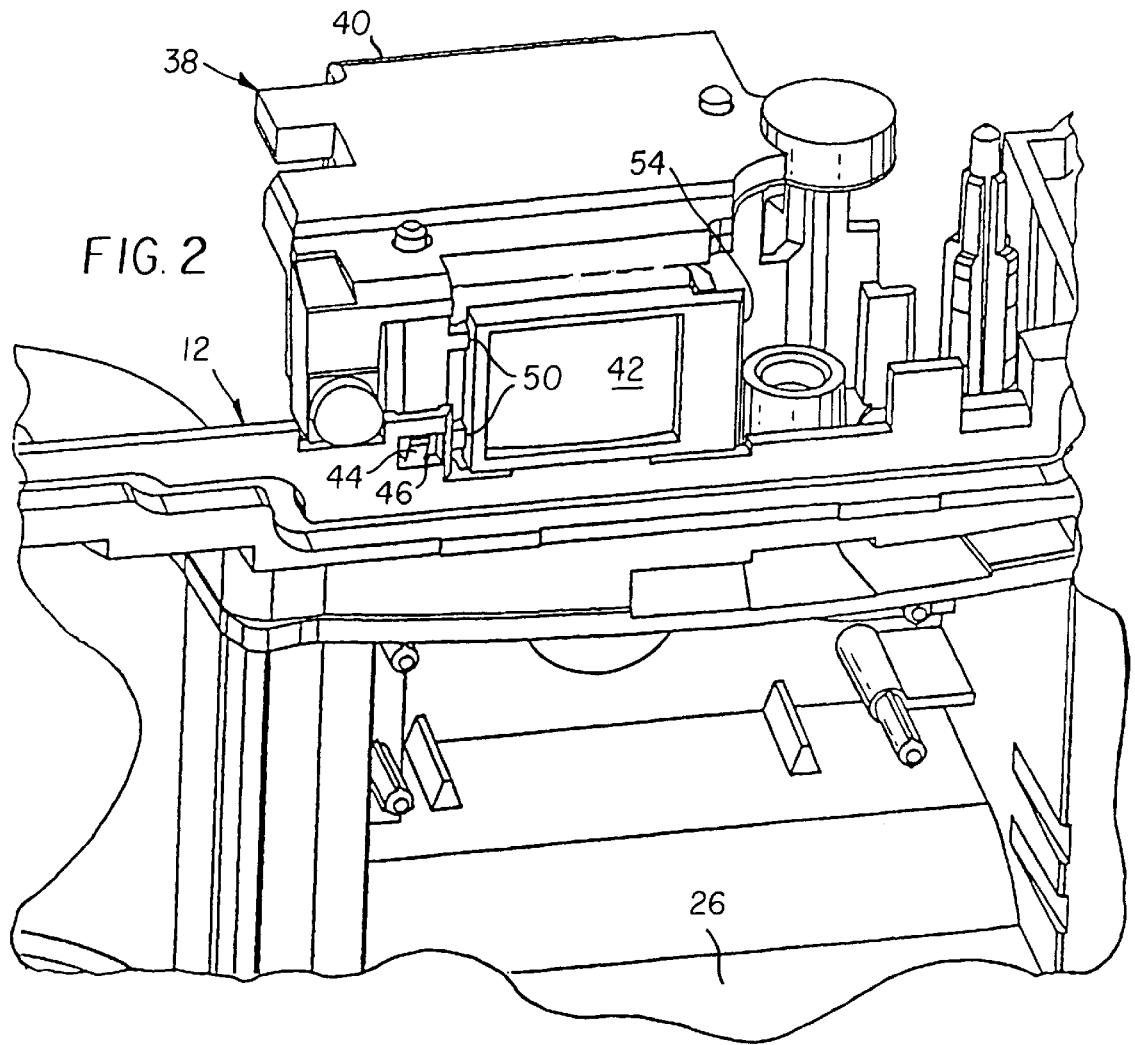
FIG. 2 is a partial rear perspective view of the main body part with the viewfinder unit, including the front and rear viewfinder lenses.
Figure 3:
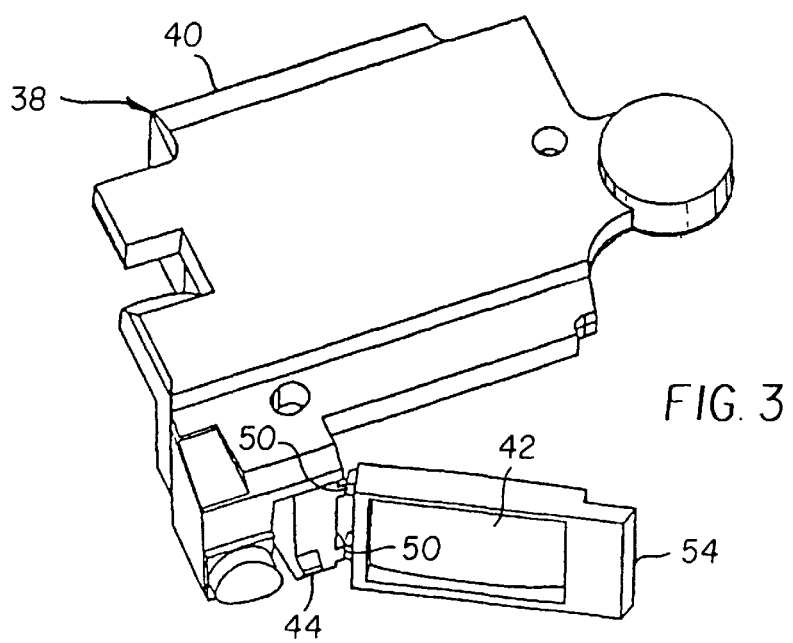
FIG. 3 is a rear perspective view of the viewfinder unit.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

One-Time-Use Camera

Referring now to the drawings, FIGS. 1–5 show a one-time-use camera 10 which includes a plastic opaque main body part 12 and a pair of plastic opaque front and rear cover parts 14 and 16 which house the main body part between them. The front and rear cover parts 14 an 16 are connected to one another and to the main body part 12 via known hook-in-hole connections (not shown) such as disclosed in prior art U.S. Pat. No. 5,815,740 issued Sep. 29, 1998, and prior art U.S. Pat. No. 5,349,510 issued Sep. 20, 1994/

As is known, the main body part 12 has a rearwardly open cartridge receiving chamber 18 for a conventional film cartridge 20 and a rearwardly open film supply chamber 22 for a rotatably supported film supply spool 24 for an unexposed film roll (not shown). See FIG. 1. A back-frame opening 26 is located between the cartridge receiving chamber 18 and the film supply chamber 22 for exposing successive imaging sections (frames) of a filmstrip 28 which forms the unexposed film roll.

A film winding thumbwheel 30, rotatably supported on the main body part 12, protrudes outwardly from a slot (not shown) in the rear cover part 16 and has a depending coaxial stem (not shown) in coaxial engagement with an exposed top end of a film spool inside the film cartridge 20. Manual winding rotation of the film winding thumbwheel 30 counter-clockwise in FIG. 1 similarly rotates the film spool to wind each exposed imaging section of the filmstrip 28 into the film cartridge 20.

The rear cover part 16 has a door cover portion 32 over the cartridge receiving chamber 18 and a remaining cover portion 34. A fracture line of weakness 36 which divides the door cover portion 32 and the remaining cover portion 34 permits the door cover portion to be pivoted open relative to the remaining cover portion in order to remove the film cartridge 20 from the cartridge receiving chamber 18. The film cartridge 20 is to be removed from the cartridge receiving chamber 18 when the maximum number of exposures available on the filmstrip 28 have been made and the filmstrip is completely wound into the film cartridge.

Figure 5:
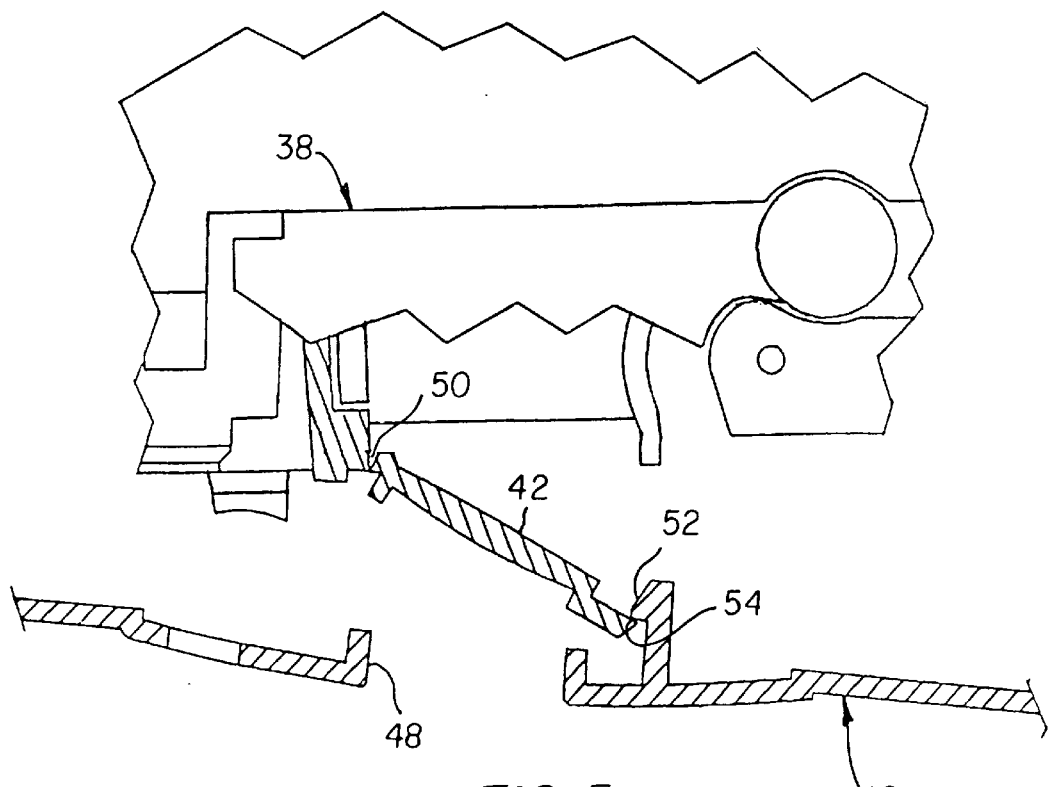

The rear cover part 16 can be separated from the main body part 12, as shown in FIGS. 1 and 5, to permit fresh (unexposed) film to be loaded into the one-time-use camera 10.

A viewfinder unit 38 has a pair of front viewing (objective) and rear viewing (eye) lenses 40 and 42 that are optically aligned for viewing a subject to be photographed. A hook 44 on the viewfinder unit 38 and a hole 46 in the main body part 12 connect the viewfinder unit to the main body part 12. See FIGS. 2 and 3. A viewing opening 48 in the rear cover part 16 is positioned over the rear viewing lens 42. A similar opening (not shown) in the front cover part 14 is positioned over the front viewing lens 40.

Figure 4:
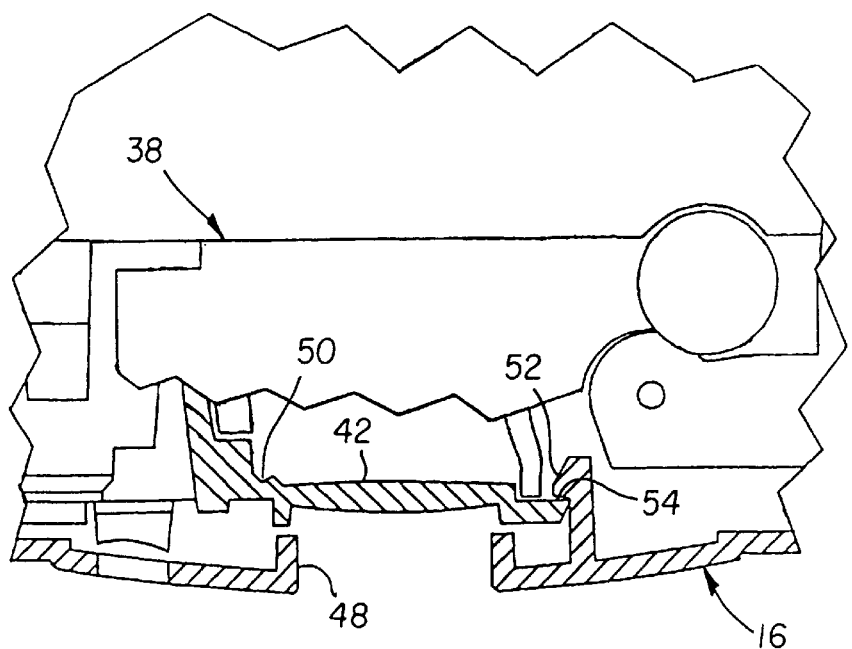
FIGS. 4 and 5 are plan sectional views of the rear cover part and the viewfinder unit, showing how the rear viewing lens is moved out of optical alignment with the front viewing lens when the rear cover part is separated from the main body part.

As shown in FIG. 4, the rear viewing lens 42 is spaced opposite the viewing opening 48 to be separate from the rear cover part 16.

Two spaced in-line fracture lines of weakness 50, 50 divide (exist directly between) the rear viewing lens 42 and the remainder of the viewfinder unit 38 including the front viewing lens 40. A hook 52 on the rear cover part 16, adjacent the rear viewing opening 48, directly engages an edge extension 54 of the rear viewing lens 42 for two different purposes. First, the hook 52 serves to hold the rear cover part 16 to the viewfinder unit 38 to, in turn, hold the rear cover part to the main body part 12. Second, when the rear cover part 16 is separated from the main body part 12 as shown in FIGS. 1 and 5, the hook 52 pivots the rear viewing lens 42 at the fracture lines of weakness 50, 50 to move the rear viewing lens out of optical alignment with the front viewing lens 40. The fracture lines of weakness 50, 50 are thus broken to possibly sever the rear viewing lens 42 from the reminder of the viewfinder unit 38. This incapacitates the viewfinder unit 38, and permits the rear viewing lens 42 to be readily identified to discard the viewfinder unit (rather than permit it be erroneously reused).

Method

A method of incapacitating the viewfinder unit 38 to permit the viewfinder unit to be readily identified to be discarded (rather than be erroneously reused) comprises the steps of:

separating the cover part 14 at least partially from the main body part 12 as shown in FIGS. 1 and 5, and moving the rear viewing lens 42 out of optical alignment with the front viewing lens 40 when the rear cover part is separated at least partially from the main body part 12, whereby the rear viewing lens can readily be identified to prevent the viewfinder unit 38 from being erroneously reused. Preferably, the rear viewing lens 42 is severed from the remainder of the viewfinder unit 38 along the fracture lines of weakness 50, 50.

The invention has been described with reference to a preferred embodiment. However, it will be appreciated that variations and modifications can be effected by a person of ordinary skill in the art without departing from the scope of the invention. For example, instead of the rear viewing lens 42 being moved out of optical alignment with the front viewing lens 40 when the rear cover part 16 is separated from the main body part 12 to permit fresh (unexposed) film to be loaded into the one-time-use camera 10, the rear viewing lens can be moved out of optical alignment with the front viewing lens when the door cover portion 32 is pivoted open relative to remaining cover portion 34 to remove the film cartridge 20 from the cartridge receiving chamber 18. Also, of course, the front viewing lens 40 can be made to be moved out of optical alignment with the rear viewing lens 42.

PARTS LIST 10. one-time-use camera
12. main body part
14. front cover part
16. rear cover part
18. cartridge receiving chamber
20. film cartridge
22. film supply chamber
24. film supply spool
26. backframe opening
28. filmstrip
30. film winding thumbwheel
32. door cover portion
34. remaining cover portion
36. fracture line of weakness
38. viewfinder unit
40. front viewing lens
42. rear viewing lens
44. hook
46. hole
48. viewing opening
50, 50. fracture lines of weakness
52. hook
54. edge extension

What is claimed is:

1. A one-time-use camera comprising a main body part, a cover part having a viewing opening and that can be separated at least partially from said main body part, and a viewfinder having a pair of front and rear viewing lenses optically aligned for viewing through said viewing opening a subject to be photographed, is characterized in that:

one of said front and rear viewing lens is spaced opposite said viewing opening to be separate from said cover part; and said cover part has an engaging projection engaged directly with said one viewing lens to move the one viewing lens out of optical alignment with the other viewing lens when said cover part is separated at least partially from said main body part, whereby said one viewing lens can be readily identified to prevent said viewfinder from being erroneously reused.

2. A one-time-use camera as recited in claim 1, wherein said one viewing lens is connected to said main body part in addition to being engaged with said engaging projection of said cover part.

3. A one-time-use camera as recited in claim 1, wherein said viewfinder is connected to said main body part, and a fracture line of weakness exists directly between said one viewing lens and a remainder of said viewfinder including the other viewing lens which is broken to sever said rear viewing lens from said remainder of the viewfinder when said one viewing lens is moved out of optical alignment with said other viewing lens.

4. A one-time-use camera comprising a main body part, a rear cover part that can be separated at least partially from said main body part, and a viewfinder unit connected to said main body part and having a pair of front and rear viewing lenses optically aligned for viewing a subject to be photographed, is characterized in that:

a fracture line of weakness exists directly between said rear viewing lens and a remainder of said viewfinder unit including said front viewing lens which can be broken to sever said rear viewing lens from said remainder of the viewfinder unit; and said rear cover part is connected to said rear viewing lens to move the rear viewing lens to break said fracture line of weakness and sever said rear viewing lens from said remainder of the viewfinder unit when said rear cover part is separated at least partially from said main body part.

5. A one-time-use camera as recited in claim 4, wherein said fracture line of weakness allows said rear viewing lens to be pivoted on said viewfinder unit to be moved out of optical alignment with said front viewing lens, and said rear cover part is connected to said rear viewing lens to pivot the rear viewing lens on said viewfinder unit when the rear cover part is separated at least partially from said main body part.

6. A one-time-use camera comprising a main body part for supporting an unexposed filmstrip when the unexposed filmstrip is loaded into said camera, a rear cover part connected to said main body part which can be disconnected from the main body part to load the unexposed filmstrip into said camera, and a viewfinder unit connected to said main body part and having a pair of fixed front and rear viewing lenses optically aligned for viewing a subject to be photographed, is characterized in that:

a fracture line of weakness divides said rear viewing lens and a remainder of said viewfinder unit including said front viewfinder lens; and said rear cover part is engaged directly with said rear viewing lens to break the rear viewing lens from said viewfinder unit along said fracture line of weakness, to move the rear viewing lens out of optical alignment with said front viewing lens, when said rear cover part is disconnected from said main body part to load an unexposed filmstrip into said camera.

7. A method of incapacitating a viewfinder unit connected to a main body part in a one-time-use camera to permit the viewfinder unit to be readily identified to be discarded rather than be erroneously reused, said method comprising the steps of:

separating a cover part, which is engaged with one of a pair of optically aligned front and rear viewing lenses on the viewfinder unit, at least partially from the main body part, and breaking the one viewing lens on the viewfinder unit that is engaged with the cover part out of optical alignment with the other viewing lens on the viewfinder unit when the cover part is separated at least partially from the main body part, whereby the the viewfinder unit can readily be identified to prevent the viewfinder unit from being erroneously reused.

8. A method as recited in claim 7, wherein the one viewing lens is broken out of optical alignment with the other viewing lens along a fracture line of weakness directly between the one viewing lens and the remainder of the viewfinder unit.

\* \* \* \* \*